(12) United States Patent
Young

(10) Patent No.: US 6,612,920 B1
(45) Date of Patent: Sep. 2, 2003

(54) OPTIMIZED LOIN SAW

(75) Inventor: William D. Young, Albert Lea, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/502,848

(22) Filed: Feb. 11, 2000

(51) Int. Cl.[7] .............................................. A22C 17/00
(52) U.S. Cl. ......................... 452/171; 452/156; 83/367
(58) Field of Search ............................... 452/171, 149, 452/150, 155, 156, 157; 83/367, 368

(56) References Cited

U.S. PATENT DOCUMENTS

| | | |
|---|---|---|
| 3,363,656 A | 1/1968 | Snyder |
| 3,631,908 A | 1/1972 | Meltzer et al. |
| 3,797,353 A | 3/1974 | Calhan |
| 3,940,998 A | 3/1976 | Sourby et al. |
| 4,118,777 A | 10/1978 | Wallace |
| 4,208,936 A | 6/1980 | Whitehouse |
| 4,228,685 A | 10/1980 | Wallace et al. |
| 4,262,565 A * | 4/1981 | Pedi .............................. 83/71 |
| 4,344,341 A | 8/1982 | Lotz |
| 4,356,205 A | 10/1982 | Richards |
| 4,356,746 A | 11/1982 | Whitehouse |
| 4,420,997 A | 12/1983 | Whitehouse |
| 4,428,263 A | 1/1984 | Lindee et al. |
| 4,548,107 A | 10/1985 | Marchese et al. |
| 4,580,475 A | 4/1986 | Antonissen |
| 4,603,610 A | 8/1986 | Whitehouse |
| 4,688,296 A | 8/1987 | Clarke et al. |
| 4,866,630 A | 9/1989 | Beaman et al. |
| 5,039,857 A | 8/1991 | Whitehouse |
| 5,041,056 A | 8/1991 | Hutton |
| 5,042,340 A | 8/1991 | Kasper |
| 5,054,345 A | 10/1991 | Weber |
| 5,076,124 A | 12/1991 | Whitehouse |
| 5,224,407 A | 7/1993 | Koch et al. |
| 5,477,760 A | 12/1995 | Kuchler |
| 5,481,466 A | 1/1996 | Carey |
| 5,580,306 A | 12/1996 | Young et al. |
| 5,724,874 A | 3/1998 | Lindee et al. |
| 5,883,357 A * | 3/1999 | Newman et al. ....... 219/121.67 |
| 5,902,177 A | 5/1999 | Tessier et al. |

FOREIGN PATENT DOCUMENTS

GB   2 149 650   6/1985

* cited by examiner

*Primary Examiner*—Charles T. Jordan
*Assistant Examiner*—Joan M. Olszewski
(74) *Attorney, Agent, or Firm*—Merchant & Gould P.C.

(57) ABSTRACT

An automated cutting apparatus and method having a coordinated three axes of motion wherein one axis is designated as a master and provides a master time source and the other two axes are designated as slaves and more proportionately to the master axis. A controller and input device are coupled to the three axes to control the movement thereof. The input device preferably presents an operator with selectable input parameters that allow the operator to divide the piece of meat into groups and designate varying thicknesses for each group.

20 Claims, 8 Drawing Sheets

OPTIMIZED LOIN SAW

FIELD OF THE INVENTION

This invention is directed to an apparatus and method for cutting a meat product and, more particularly, to an automated apparatus and method for cutting a meat product that increases throughput and improves safety for an operator.

BACKGROUND OF THE INVENTION

Various steps are typically required in the processing meat carcasses such as hog carcasses. One step that typically occurs after a hog is slaughtered is the separation of the carcass into separate pork sides. The loin and belly portions of the individual pork sides are then separated from one another and individual chops are cut from the loin portion.

These operations have traditionally been performed by human operators using different handheld tools. An operator at a work station typically uses a bandsaw to cut the individual chops. Using human operators to perform the chop cutting operation, however, poses several problems. One problem is the time consuming nature of the chore which limits throughput since each chop must be cut by hand. Also, because the operator is handling the cutting tools, safety is a serious concern. In addition, the repeatability of the operation is a concern since it is very difficult for an operator to consistently cut chops of a desired thickness.

To address the problems associated with manual processes, various automated systems have been proposed. Examples include U.S. Pat. Nos. 4,603,610 and 4,688,296; for example, among others.

Many of these systems attempt to replace human operators with automated cutting tools, often resulting in greater efficiency and more repeatable results. However, many prior automated systems are limited in the degree of control they provide.

SUMMARY OF THE INVENTION

According to a first aspect of the invention, there is provided an automated cutting apparatus including a cutting tool, a cutting platform, a programmable controller and an input device. The cutting platform is located adjacent to the cutting tool for transporting a piece of meat to the cutting tool. The programmable controller is coupled to the cutting platform and cutting tool. The programmable controller sends commands to the cutting platform and the cutting tool to control their respective movement. The input device is coupled to the programmable controller and has input parameters selectable by an operator to specify thicknesses and quantities of chops cut from the piece of meat for a plurality of groups. The programmable controller uses the input parameters to control the movement of the cutting tool and cutting platform accordingly.

According to a second aspect of the invention there is provided an automated cutting apparatus including a cradle for holding a piece of meat therein; a first, second and third carriage; a first, second and third actuator; and a controller. The first carriage is located at a first end of the cradle and the first actuator is operatively coupled to the first carriage to move the first carriage along a first axis. The second carriage is located at a second end of the cradle and the second actuator is operatively coupled to the second carriage to move the second carriage along the first axis. The third carriage is located along a side of the cradle in between the first and second end of the cradle and the third actuator is operatively coupled to the third carriage to move the third carriage along a second axis. The second axis is perpendicular to the first axis. The controller is operatively coupled to the first, second and third actuators wherein the controller controls the speed of movement of the first, second and third actuators. The speed of movement of the first and second actuators is directly proportional to the speed of movement of the third actuator.

According to a third aspect of the invention, there is provided a system for automatically cutting meat, the system includes an advance actuator moveable along an advance axis, a backstop actuator movable along a backstop axis, and a cut actuator movable along a cut axis. The cut axis is perpendicular to the advance and backstop axes. Also included is a general purpose computing device operatively coupled to the advance, backstop and cut actuators, and a computer program including one or more program modules executable by the computing device. The program modules include an input module for receiving input parameters selected by an operator, a motion control module for converting input parameters received by the input module to output commands to control the movement of the advance actuator, backstop actuator, cut actuator and cutting tool according to the input parameters selected by an operator.

According to a fourth aspect of the invention there is provided a method for automatically cutting meat. The method includes the steps of receiving input parameters from an operator specifying the thicknesses and quantities of chops to be cut from a piece of meat for a plurality of groups, converting the input parameters received to motion control parameters, and outputting the motion control parameters to a cutting tool and cutting platform located adjacent to the cutting tool to control movement of the cutting tool and cutting platform according to the input parameters received.

According to a fifth aspect of the invention, there is provided a computer-readable medium having computer-executable instructions to carry out the method.

According to a sixth aspect of the invention, there is provided a computer data signal embodied in a carrier wave readable by a computing system and encoding a computer process for performing the method.

DETAILED DESCRIPTION OF THE PRESENTLY PREFERRED EMBODIMENTS

Figure 1:
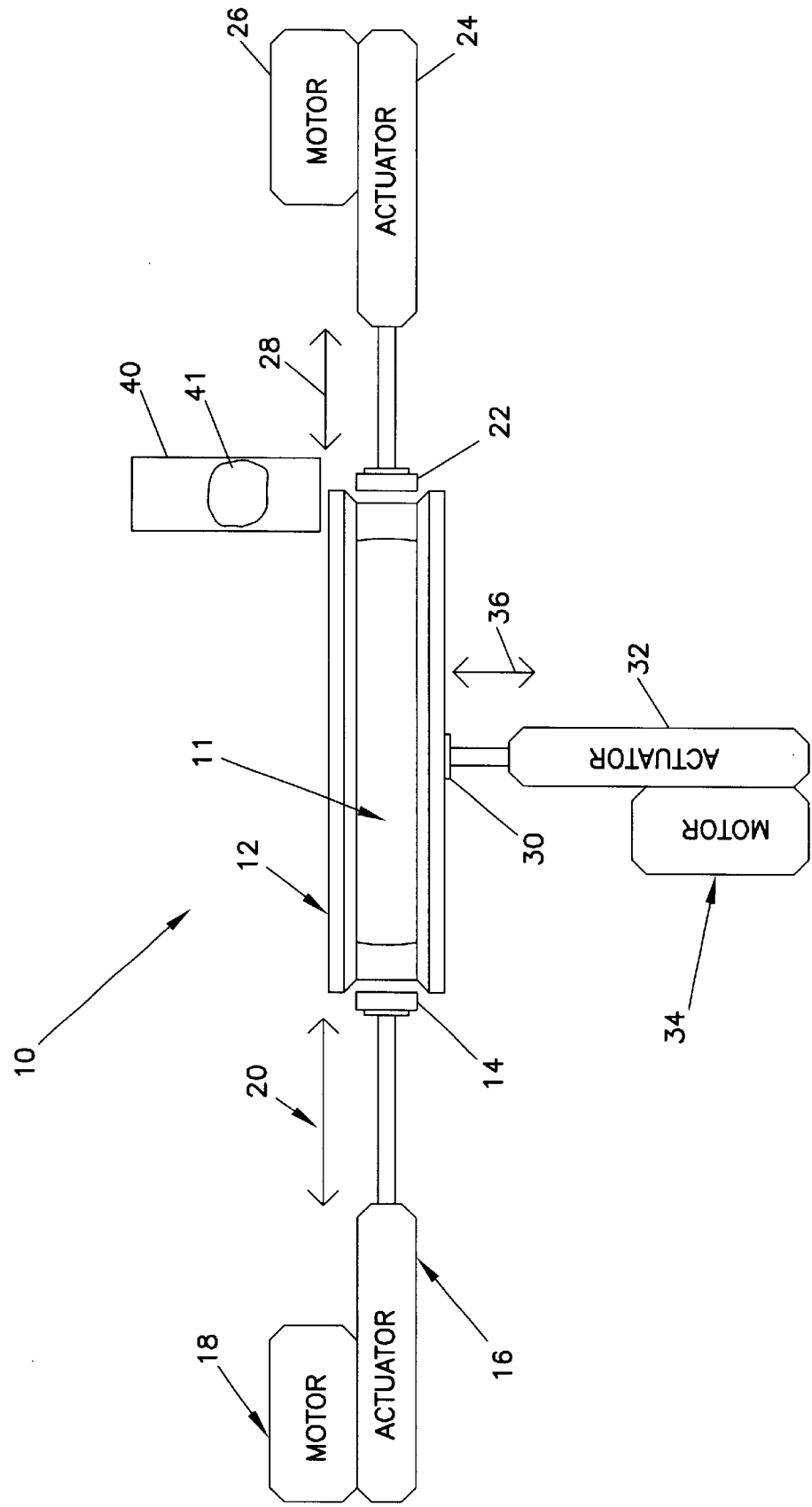
FIG. 1 is a schematic view of an automated cutting machine according to a preferred embodiment of the present invention.

FIG. 1 is a schematic view of an automated cutting machine 10 according to a preferred embodiment of the present invention. The machine 10 includes a cradle 12 in which can be loaded a piece of meat 11, preferably a loin from a hog (not shown), for example. Located at a first end of the cradle 12 is a first carriage 14, also referred to as an advance carriage 14. The advance carriage 14 is operatively coupled to an actuator 16, preferably a linear actuator, which is operatively coupled to a motor 18, preferably a servo motor. The servo motor 18 can drive the actuator 16 to move the advance carriage bidirectionally along an advance axis 20. Also included in the automated cutting machine 10 is a second carriage 22, also referred to as a backstop carriage 22, that is operatively coupled to actuator 24, which preferably is a linear actuator. The actuator 24 is operatively coupled to motor 26 which in a preferred embodiment is a servo motor. The motor 26 drives the actuator 24 to move the backstop carriage 22 bidirectionally along a backstop axis 28. In a preferred embodiment, the backstop axis 28 is the same axis as the advance axis 20. A third carriage 30, also referred to as a cut carriage 30, is operatively coupled to an actuator 32 which is preferably a linear actuator. The actuator 32 is operatively coupled to a servo motor 34 which drives the linear actuator 32 to move the cut carriage 30 bidirectionally along a cut axis 36. In a preferred embodiment, the cut axis 36 is perpendicular to the advance and backstop axes 20 and 28, respectively.

The machine 10 also includes a cutting tool (not shown), preferably a saw blade, and a take-away conveyor 40 for transporting chops 41 cut from the loin 11 to another location for further processing such as a packing station, for example.

As will be described in detail hereinafter, the optimized loin saw uses the three axes of motion; the advance axis 20, backstop axis 28 and cut axis 36, to automatically cut pork chops 41 of specified thickness from whole pork loins 11. The actuators 16, 24, and 32 are capable of moving forward and backward in precise increments. As will be discussed in detail hereinafter, the motors 18, 26 and 34 are operatively coupled to a computer which is programmed to control the motion of all three axes in a coordinated manner in order to perform the cutting operation.

More particularly, the advance carriage 14 works in conjunction with the backstop carriage 22 to control the thickness of the chops 41 cut from the loin 11. The backstop axis provides a cutting reference point. The backstop axis sets the thickness of the cut equal to the distance the advance axis moves the loin 11 for each cut.

The advance axis 20 moves the loin 11 towards the backstop carriage 22 before the cutting stroke and pulls the loin back a small amount to clear the blade on the return stroke. Preferably, the advance carriage 14 has a mechanical gripper (not shown) attached to it which holds the loin 11 coupled to the advance carriage 14. The cutting carriage 30 is responsible for moving the loin 11 back and forth through the cutting blade of the bandsaw (not shown).

The control system, as will be described in detail hereinafter, utilizes a time-based following technique where the control is synchronized to other events. A master time source is selected, in this preferred embodiment, it is the movement of the cutting carriage along the cutting axis. The movement of other pieces of the machine are slaved to the master time source, in this preferred embodiment, it is the movement of the backstop and advance carriages. Thus, the speed of motion of the machine is slaved to the master axis. If the movement of the cut carriage 30 speeds up or slows down, the slave axes, i.e. axes 20 and 28, will also change speed proportionately. This allows an operator the ability to easily change the cutting speed of the machine 10 by simply adjusting the speed of movement of the cutting carriage 30.

Figure 2:
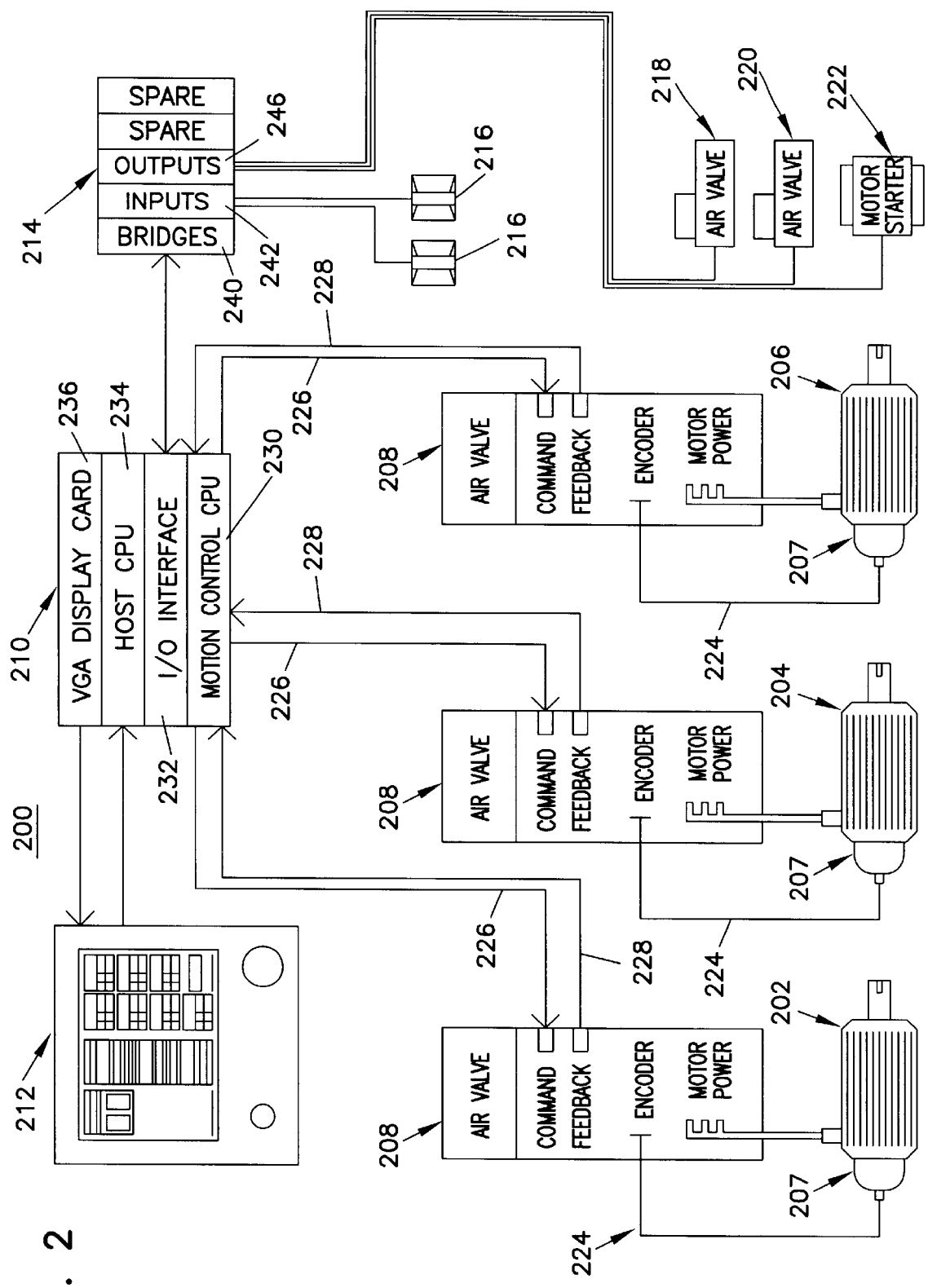
FIG. 2 is a block diagram of a control system of the optimized loin saw according to a preferred embodiment of the present invention.

FIG. 2 is a block diagram of a control system 200 of the optimized loin saw according to a preferred embodiment of the present invention. The control system 200 includes servo motors 202, 204, 206; servo amplifiers 208, a computer 210, a touch screen input device 212, an input/output rack 214, start switches 216, air valves 218, 220 and a motor starter 222. The servo motors 202, 204, 206 are the servo motors used to control the three actuators 16, 24, 32 of FIG. 1 which in turn control the movement of the carriages 14, 22, 30 along their respective axes. Each servo motor includes an encoder 207 which is operatively coupled to an amplifier 208 as is well known. Each amplifier 208 has an encoder output 224 operatively coupled to the encoder 207 of its respective motor as well as a feedback output 228 which is operatively coupled to the computer 210. In addition, each amplifier 208 has a command input 226 operatively coupled to the computer 210 to receive commands from the computer. Each amplifier 208 supplies power to its respective motor.

The computer 210 includes a motion control central processing unit (CPU) 230, an input/output interface 232, a host central processing unit 234 and a display card 236. In addition, the computer 210 has memory (not shown) for storing computer programs that have one or more program modules executable by the computer that control the operation of the machine. In a preferred embodiment, the computer-executable instructions are stored on a computer-readable medium. The computer 210 is operatively coupled to the touch screen input device 212, the I/O rack 214 and each amplifier 208. In particular, the motion control CPU 230 of the computer 210 is operatively coupled to the command input 226 and feedback output 228 of each amplifier 208. In a preferred embodiment, the motion control CPU a model PMAC 2-PC Ultralite is commercially available from Delta Tau Data Systems of Chadsworth, Calif. The input/output interface 232 is operatively coupled to the input/output (I/O) rack 214 for bi-directional communication therewith. Alternatively, the I/O rack 214 can be eliminated and inputs and outputs can be taken directly from the computer 210. The host CPU 234 is operatively coupled to receive outputs from the touch screen input device 212. The display card 236 is operatively coupled to supply signals to the touch screen 212.

The I/O rack 214 has a plurality of cards including a bridge card 240 that is operatively coupled to the input/output interface 232 of the computer 210, an input card 242 which is operatively coupled to the start switches 216 and an output card 246 which is operatively coupled to the air valves 218, 220 and motor starter 222. Air valve 218 is preferably coupled to a vacuum cut (not shown) to grip the loin 11 when it is placed in the cradle 12. Air valve 220 is coupled to a chop ejector (not shown) which ejects a cut chop onto the take-away conveyor 40 shown in FIG. 1. The motor starter 222 is coupled to the cutting tool, i.e., band saw, of FIG. 1.

The touch screen 212 is located remotely from the machine 10 preferably adjacent to it on the plant floor. The touch screen displays the machine's status and accepts an operator's input commands to control the machine 10. In particular, the operator can select the thickness of cuts made from the loin as well as dividing the loin into a plurality of groups and selecting the number of chops to be cut for each group. The thickness selected for the chops may be different from group to group. The host CPU 234 executes an operator interface program while the motion control CPU 230 controls the motion of the machine. The input/output rack 214 provides all discrete inputs and outputs for the machine. The servo amplifiers 208 accept velocity command signals from the computer 210 and provide the power to drive the servo motors 202, 204 and 206. The servo motors 202, 204 and 206 produce controlled motion to perform a cutting operation as will be described in detail hereinafter. As a safety precaution, the start switches 216 must be operated simultaneously by an operator to initiate a cutting cycle.

Figure 3:
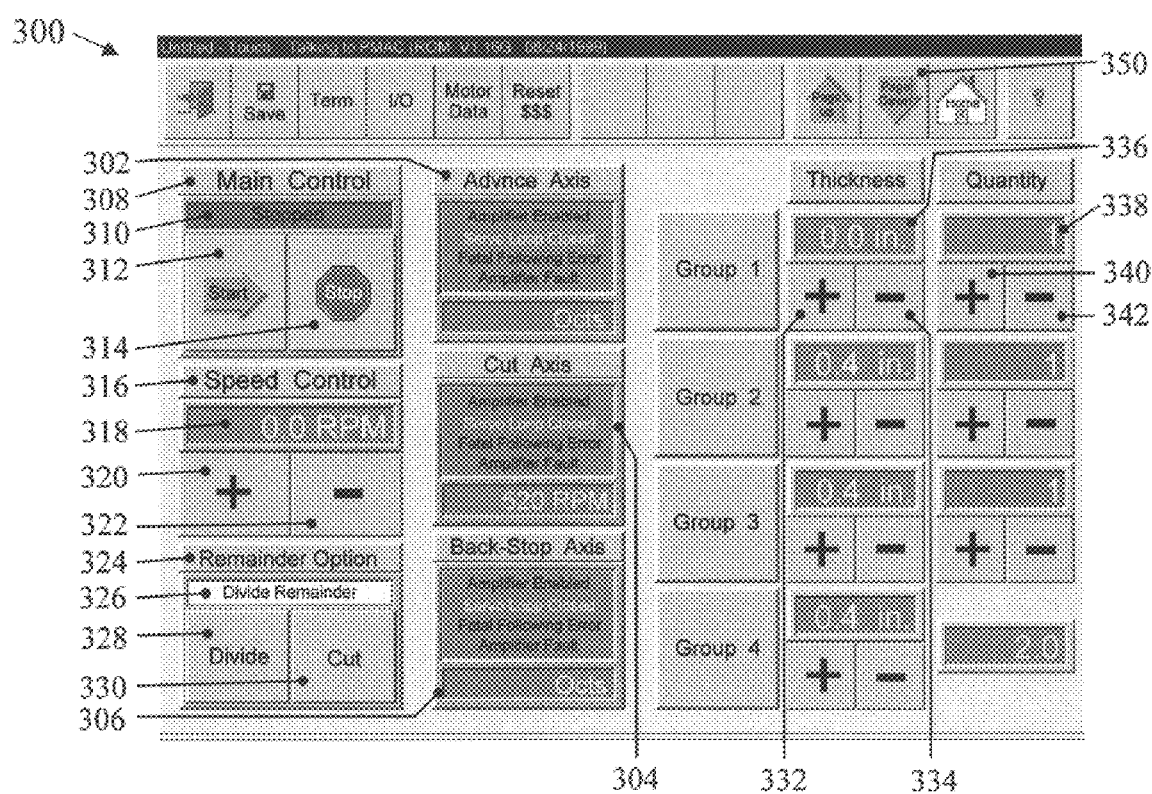
FIG. 3 is a screen shot of a display provided at the touch screen of the machine.

FIG. 3 is a screen shot 300 of a display provided at the touch screen 212 shown in FIG. 2. Preferably a graphical user interface is provided at the touch screen. The screen shot 300 provides a plurality of information to an operator. Preferably the screen shot 300 conveys status information of the machine, including the condition of the advance carriage as shown at 302, the cut carriage as shown in 304 and the backstop carriage as shown at 306. In addition, a main control 308 indicates the current state of the machine as shown at window 310 and also provides the operator the ability to change the current state of the machine, i.e., start and stop the machine, through screen buttons 312, 314, respectively. A speed control 316 is also provided which allows an operator to view the current speed setting at 318 and change the speed setting with screen buttons 320, 322. A remainder option control 324 is provided which allows the operator to determine what to do with the remainder of the loin. The operator can view the current setting at window 326 and change the current setting through screen buttons 328, 330 which will be described in detail hereinafter.

As previously described, the operator has the option of dividing the loin into four groups. Alternatively, more or less than four groups may be provided. For each group, the thickness of the cut can be set by the operator using screen buttons 332, 334. The current thickness of the chops for each group is displayed in windows 336. In addition, for all but the last group, the operator can select the quantity of chops to be cut. The current quantity is displayed in windows 338 and the operator can change the current setting with screen buttons 340, 342. For the last group, the quantity is automatically determined based upon the selection made in the remainder options control 324. For example, if the operator has selected the divide option 328, then the remainder of the loin would be divided equally among each chop. If the operator has selected the cut option 330, then the remainder of the loin would be cut as a separate chop of unspecified length.

From the screen 300, the operator has a top menu bar 350 from which he or she can select various options. For example, the operator can choose to save the parameters selected, terminated the operation of the machine, view the input/outputs, view the motor data and reset the operation of the machine.

The operation of the optimized loin saw will now be described in detail with reference to the flow charts of FIGS. 4–8. The flowcharts of FIGS. 4–8 represent software stored in the computer 210 of the machine, and more preferably, software that is executed by the motion control CPU 230 of the computer. The operator inputs thickness and count parameters from the touch screen 300 shown in FIG. 3. Once these parameters are entered, the operator activates the start switches 216 shown in FIG. 2 and the machine 10 performs the operation of the cutting pork chops from the loin 11 located in the cradle 12 shown in FIG. 1.

Figure 4:
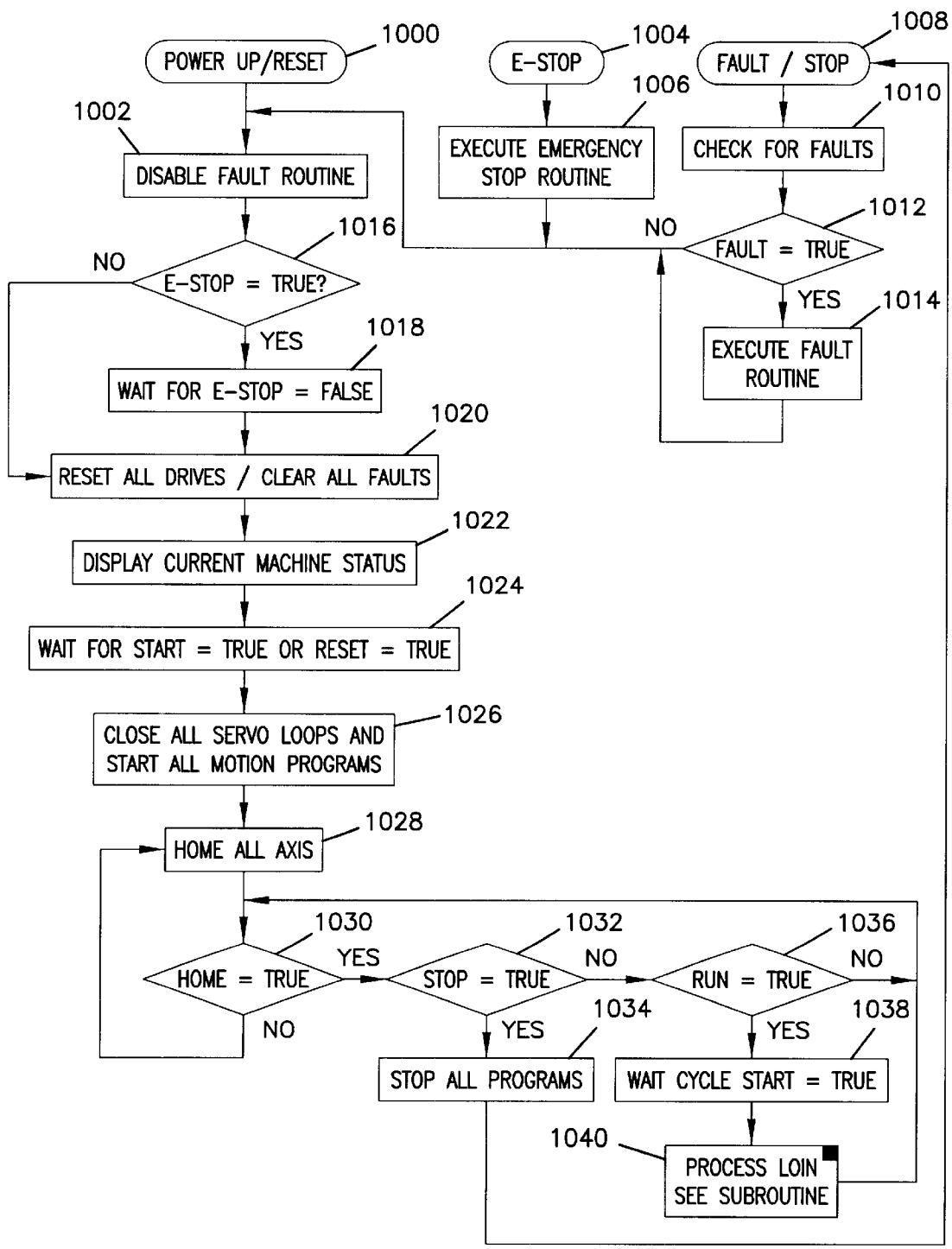
FIGS. 4–8 are flow charts of the operation of the optimized loin saw according to a preferred embodiment of the present invention.
Figure 5:
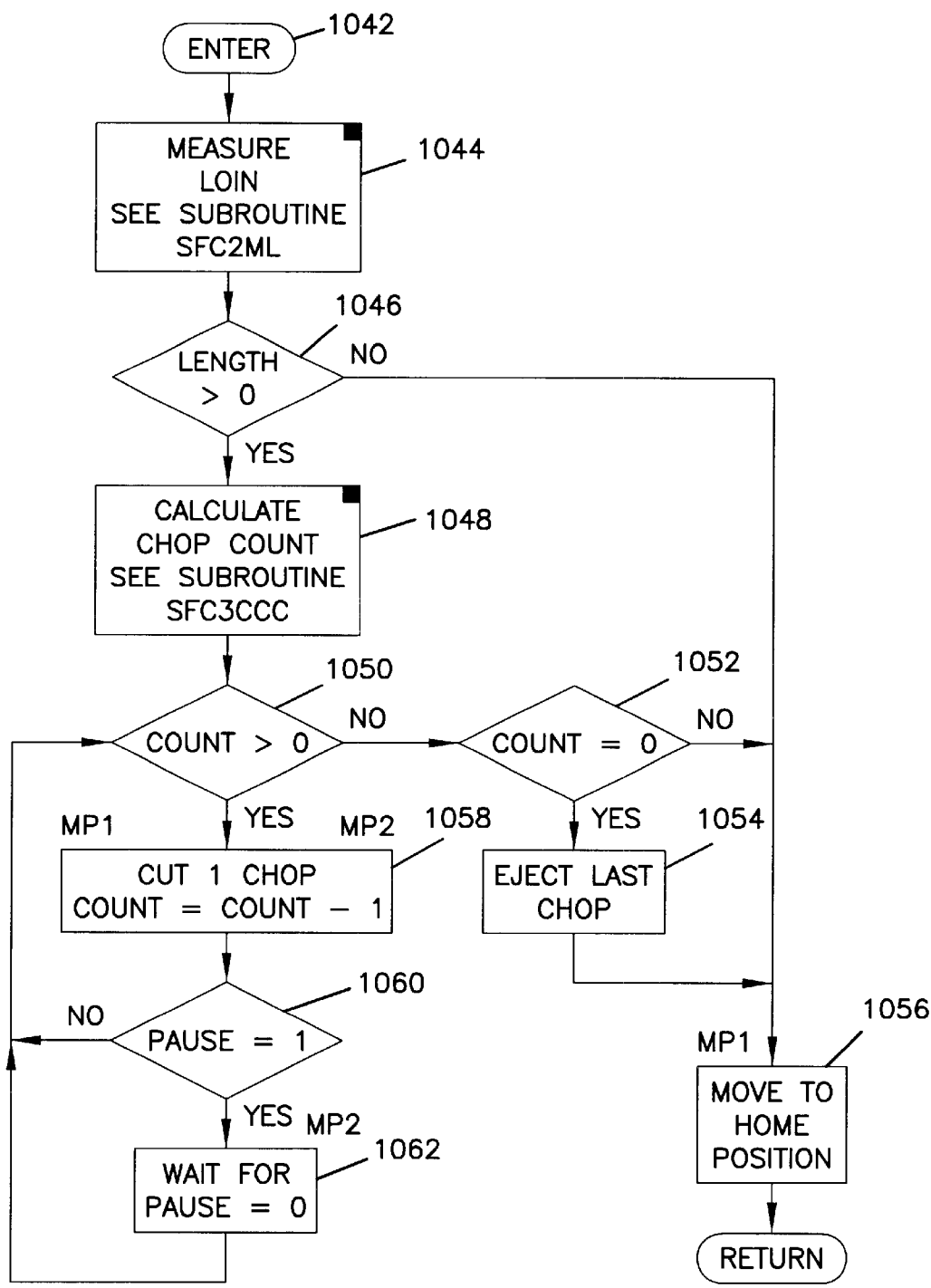
Figure 6:
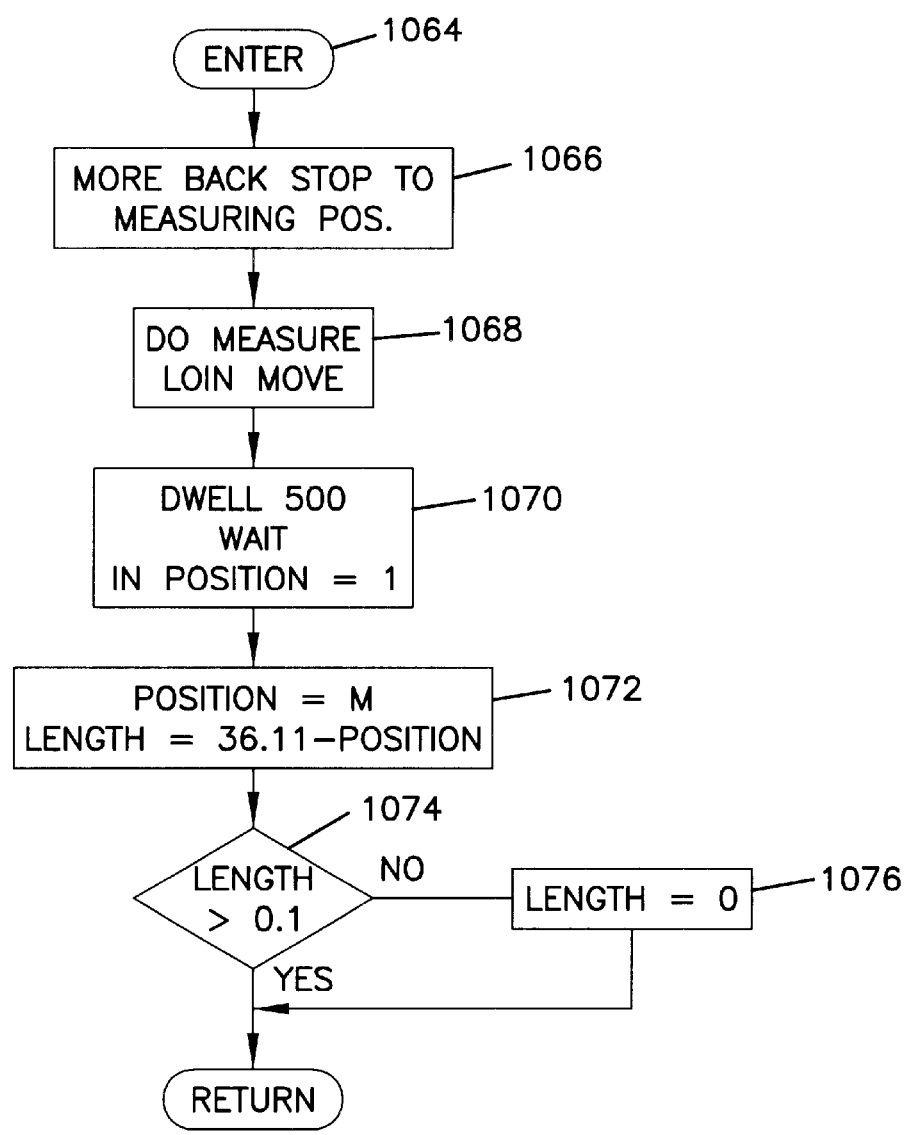

FIG. 4 is a flow chart for the main operation of the motion control CPU 230 of computer 210. In the flow charts, an oval represents an entry point into the program, a diamond represents a decision, a parallelogram represents a wait condition, a rectangle represents an execution instruction and a rectangle with a black square represents a subroutine as will be described with reference to FIGS. 5–8. There are three main entry points into the program. The first is a power up or reset condition 1000, the second is an emergency stop condition 1004 and the third is a fault or stop condition 1008. The power up or reset condition 1000 is usually the normal start-up point. The other two entry points are atypical conditions where there is either an emergency stop condition or a fault condition. If there is an emergency stop condition 1004, then at block 1006 an emergency stop routine is executed. The emergency stop routine does not form part of the invention and thus need not be described in detail herein. If a fault or stop condition 1008 is present, then at block 1010 the machine is checked for faults. If it is determined at block 1012 that a fault is detected, then at block 1014 a fault routine is executed. The fault routine does not form part of the invention and thus need not be described in detail. If no fault condition is determined at block 1012, then control is passed to block 1002 where the fault routine is disabled. The same sequence occurs if a power up or reset condition 1000 is present.

Thus, after the fault routine has been disabled at 1002, control is then transferred to decision block 1016 where it is determined whether the emergency stop is active. If it is, then at block 1018 the program waits for the emergency stop condition to be removed. If it is determined that the emergency stop condition is not present or has been removed, control is transferred to block 1020 where all of the drives are reset and all of the faults are cleared. At block 1022 the current status of the machine is displayed to the operator on the touch screen shown in FIG. 3 as previously described. At block 1024 the program waits for either a command to start or reset to be present. Once this happens, at block 1026 all of the servo loops are closed and the motion programs are started as will be described next.

At block 1028 all three axes of the machine 10 shown in FIG. 1 are moved to a home position and at block 1030 it is determined whether in fact all of the axes are located at the home position. If they have not, then control is returned to block 1028 where the axes are again commanded to return to a home position. This loop continues until all of the axes have been brought to their home position. If it was determined at block 1030 that the axes have been moved to their home position, then at block 1032 it is determined whether a stop condition is present. If a stop condition is present, then at block 1034 the program is stopped and control is returned to entry point 1008. If a stop condition is not present, then control is transferred to block 1036 where it is determined whether the cutting tool should be energized to commence the cutting operation. If it is determined at block 1036 that the cutting tool should not be energized, control is returned to block 1030. If it is determined at block 1036 that the cutting tool should be energized, control is passed to block 1038 where the program waits for a cycle start flag to be true, i.e., for the operator to start the machine. After that has happened, at block 1040 the cutting operation begins and control is passed to the process loin subroutine shown in FIG. 5.

The process loin subroutine 1000 begins at entry point 1042. At block 1044 control is passed to a measure loin subroutine shown in FIG. 6 to measure the loin loaded in the cradle. The measure loin subroutine begins at entry point 1064. At block 1066 the backstop carriage is commanded to move to a known reference position, i.e., a measuring position, so that an accurate measurement can be made. At block 1068, the advance axis is moved until the loin located in the cradle triggers a sensor (not shown) located at the cutting tool and the motor position is stored in a register as M. At block 1070, the advance axis is commanded to stop movement and remain at that position for at least for a specified length of time. At block 1072, the motor position subtracted from the known reference value, which in this particular example happens to be 36.11, to determine the length of the loin. At block 1074 it is determined if the measured length is greater than 0.1 inches. If it is not, then at block 1076 the length is set to zero. Otherwise the length is set at the value determined at block 1072. In either case, control is returned to the subroutine of FIG. 5.

Figure 7:
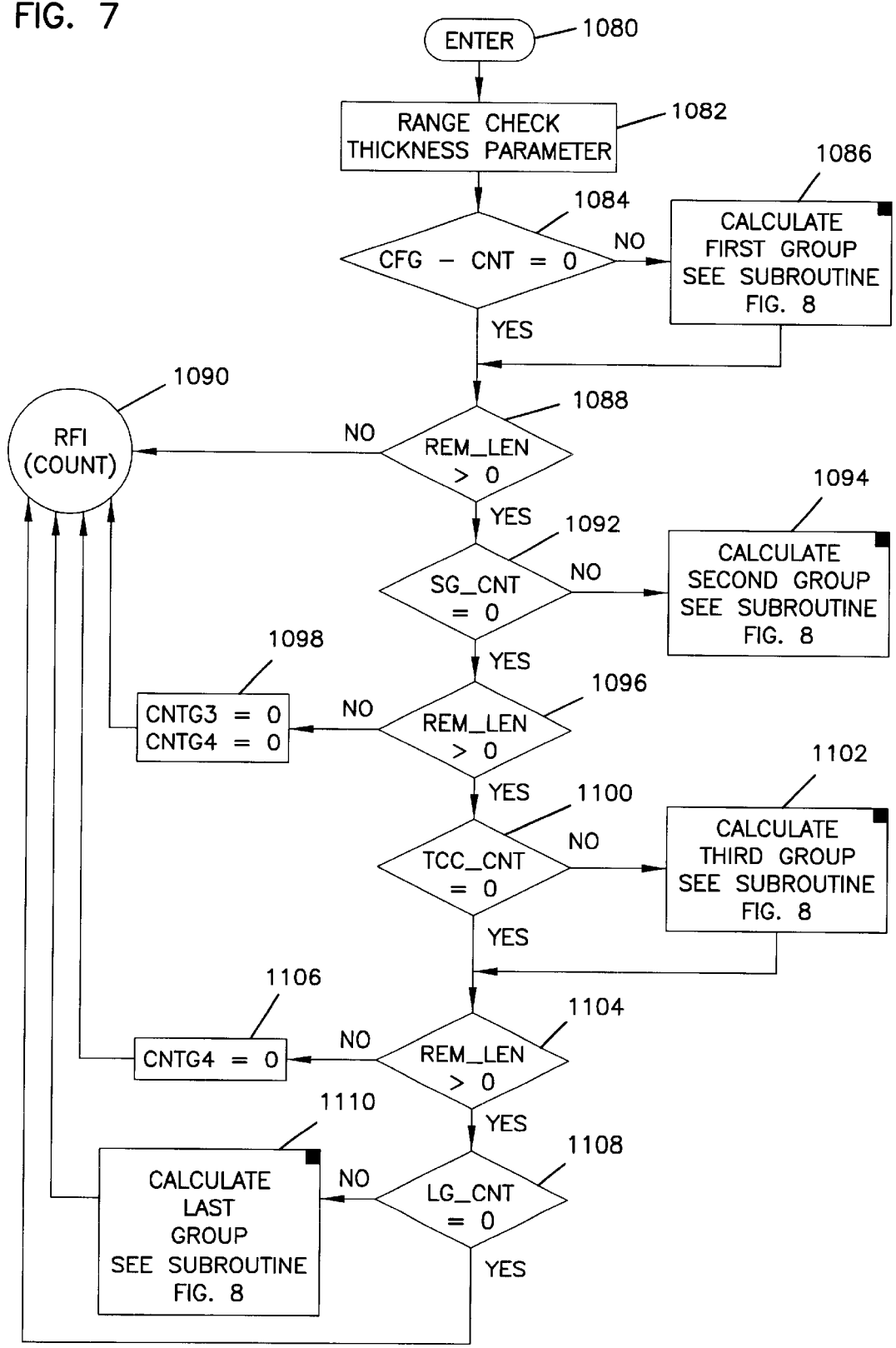

Returning to FIG. 5, after the loin has been measured at 1044, control is passed to decision block 1046 where it is determined whether the length of the loin is greater than zero. If it is not, meaning the piece of loin is too small to be cut, control is passed to block 1056 where all of the carriages are moved to their home position where the loin 11 can be removed from the cradle 12. If it is determined at block 1046 that the length of the loin is greater than zero, then at block 1048 a chop count calculation subroutine of FIG. 7 is entered.

Figure 8:
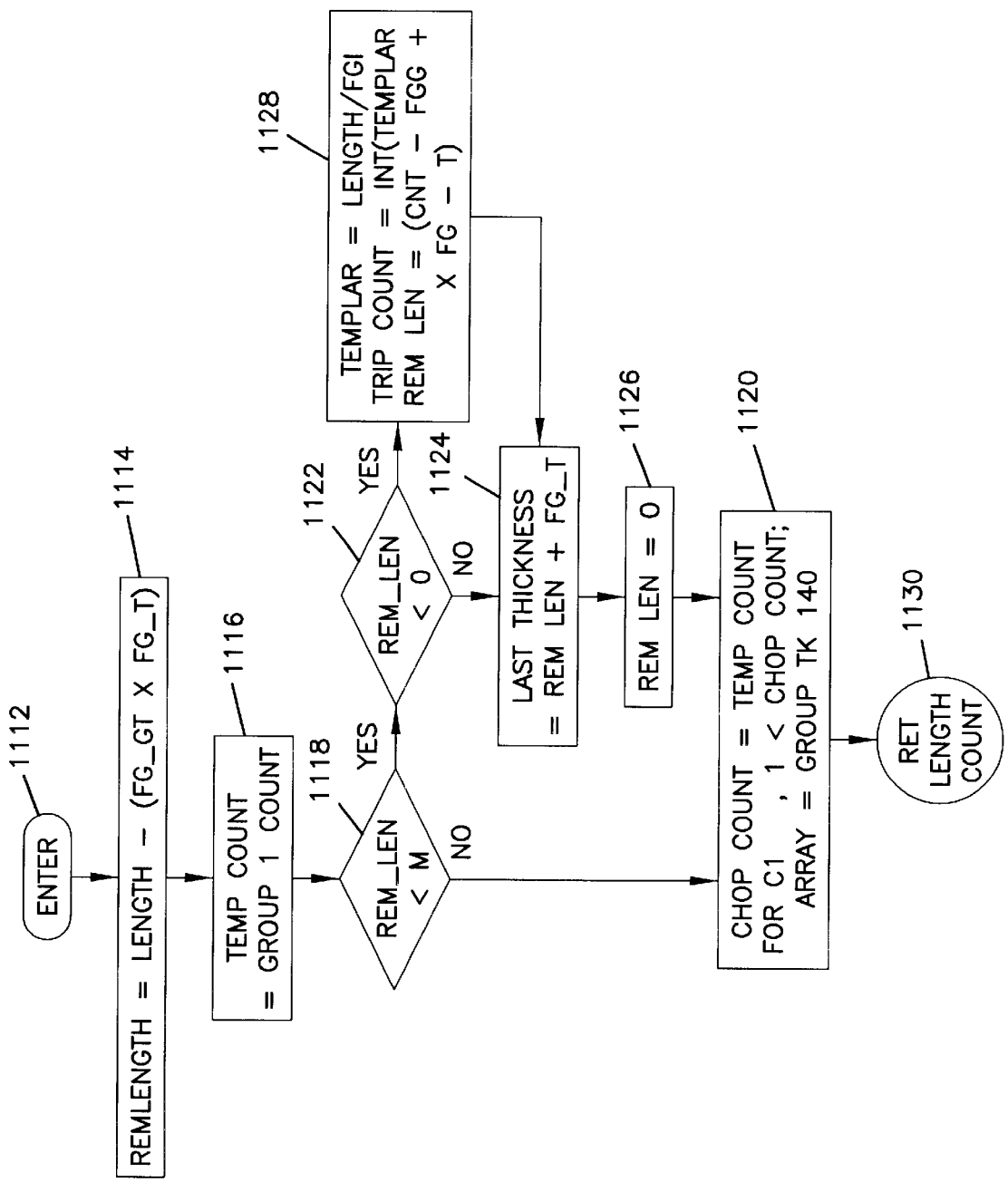

The calculate chop count subroutine is entered at point 1080. At block 1082 a check is made that the thickness parameters entered by the operator on the touch screen are within a permissible range. At decision block 1084 it is determined whether a number of counts has been entered for the first group. As previously described, an operator can enter the quantity of chops to be cut for each group through the touch screen of FIG. 3. If there are a number of counts entered for the first group, then at block 1086 a calculate group counts subroutine is entered which will be described in detail hereinafter. If there are no counts in the first group, then at block 1088 it is determined whether the remaining length of the loin is greater than zero. If it is not, control is passed to block 1090 where the chop count value determined from the subroutine of FIG. 8 are passed to the calling program. If it is determined at block 1088 that the remaining length is greater than zero, then at block 1092 it is determined whether there are counts in the second group. If there are, then at block 1094 the calculate count group for the second group is entered as will be described in detail hereinafter. If there are no counts in the second group, then at block 1096 it is determined if the remaining length of the loin is greater than zero. If it is not, then at block 1098 the third and fourth group counts are set to zero and control is passed to block 1090. If the remaining length is greater than zero, then at decision block 1100 it is determined whether there are any counts in the third group. If there are, then at block 1102 the calculate count group subroutine for the third group is entered as will be described hereinafter. If it is determined at decision block 1100 that there are no counts in the third group, then at block 1104 it is determined whether the remaining length of the loin is greater than zero. If it is not, then at block 1106 the fourth group count is set to zero and control is passed to block 1090. If it is determined at block 1104 that the remaining length is greater than zero, then at block 1108 it is determined whether there are any counts in the last group. If there are not, control is passed to block 1090. If there are counts in the last group, then at block 1110, the calculate last group subroutine is entered.

The calculate count group subroutine of FIG. 8 will now be described in detail. Entry to the subroutine is at point 1112. At block 1114 the remaining length of the loin is calculated.

This subroutine determines for each group where the operator has specified a quantity and thickness if the parameters selected can be satisfied otherwise it sets the parameters at the next best value. At block 1114 a remaining length value is calculated by multiplying the group quantity parameter (FG_G) and the group thickness parameter (FG_T) and subtracting this value from the length measurement determined in FIG. 6. At block 1116, a Temp Count variable is set equal to the count for the group being calculated, i.e., Group I Count. At block 1118, it is determined whether the remaining length of the loin is less than a minimum. If it is not, then at block 1120 the chop count is set equal to the temporary count and the thickness is entered into an array. If at block 1118 it is determined that the remaining length is not less than a minimum, at block 1122 it is determined whether the remaining length is less than zero. If it is, then the program decides how to handle the remaining portion of the loin. In particular, at block 1128 a temporary length parameter (Templer) is set equal to the measured length of the loin divided by the group thickness for the particular group being considered. The temporary count parameter (Temp Count) is replaced and a new remaining length is calculated.

In either case at block 1124 the last thickness parameter is set equal to the remaining length plus the thickness parameter entered by the operator. At block 1126 the remaining length parameter is set equal to zero and control is returned to block 1120. At block 1130 the length and count parameters are returned to the calling program.

Returning to FIG. 5, after the chop count for each group has been calculated, at decision block 1050 it is determined if the chop count is greater than zero. If it is, then at block 1058 a chop is cut and the count for that group is reduced by one. At decision block 1060, it is determined whether a pause flag has been set at 1. The operator can place the machine in a pause state for various reasons, for example, if there is trouble on the line on the exit conveyor can not keep up, etc. If it has not, control is returned to decision block 1050. If at block 1060 it is determined that the pause flag has been set at one, at block 1062 the program waits for the pause flag to be set to zero. After the pause flag has been set to zero, control is returned to block 1050. If at decision block 1050 it is determined that the count is not greater than zero, at decision block 1052 it is determined whether the count equals zero. If it does, then at block 1054 the last chop is ejected onto the take-away conveyor 40 of FIG. 1 and control is passed to block 1056 as previously discussed. If at block 1052 the count does not equal, then control is passed to block 1056.

The above specification, examples and data provide a complete description of the manufacture and use of the invention. Since many embodiments of the invention can be made without departing from the spirit and scope of the invention, the invention resides in the claims hereinafter appended.

What is claimed is:

1. An automated cutting apparatus comprising:
   (a) a cutting tool;
   (b) a cutting platform located adjacent to the cutting tool for transporting a piece of meat to the cutting tool, wherein the cutting platform comprises:
      (i) a cradle for holding the piece of meat;
      (ii) a first carriage located at a first end of the cradle;
      (iii) a first activator operatively coupled to the first carriage to move the first carriage along a first axis;
      (iv) a second carriage located at a second end of the cradle;
      (v) a second activator operatively coupled to the second carriage to move the second carriage along the first axis;
      (vi) a third carriage located along a side of the cradle inbetween the first and second end of the cradle; and (vii) a third activator operatively coupled to the third carriage to move the third carriage along a second axis wherein the second axis is perpendicular to the first axis;

(viii) wherein the controller sets the speed of movement of the first and second actuators proportionately to the speed of movement of the third actuator;

(c) a programmable controller coupled to the cutting platform and cutting tool wherein the programmable controller sends commands to the cutting platform and the cutting tool to control their respective movements; and (d) an input device coupled to the programmable controller, the input device comprising input parameters selectable by an operator to specify thicknesses and quantities of chops cut from the piece of meat for a plurality of groups wherein the programmable controller uses the input parameters to control the movement of the cutting tool and cutting platform accordingly.

2. The apparatus of claim 1 wherein the plurality of groups comprises at least four.

3. The apparatus of claim 1 wherein the thicknesses and quantities of chops can vary among the plurality of groups.

4. The apparatus of claim 1 wherein the input device is a touch screen located remotely from the cutting tool.

5. The apparatus of claim 1 further comprising a take-away conveyor located adjacent to the cutting platform and cutting tool for transporting chops cut from the piece of meat.

6. The apparatus of claim 1 wherein the input device further comprises input parameters selectable by the operator to specify the speed of movement of the third actuator.

7. An automated cutting apparatus comprising:

a cutting tool;

a cutting platform located adjacent to the cutting tool for transporting a piece of meat to the cutting tool;

a programmable controller coupled to the cutting platform and cutting tool wherein the programmable controller sends commands to the cutting platform and the cutting tool to control their respective movements; and an input device coupled to the programmable controller, the input device comprising input parameters selectable by an operator to separately specify thicknesses and quantities of chops cut from the piece of meat for each of a plurality of groups wherein the programmable controller uses the input parameters to control the movement of the cutting tool and cutting platforms accordingly, and wherein the input device further comprises input parameters selectable by the operator to specify what to do with a remainder of the piece of meat after the plurality of groups have been cut.

8. An automated cutting apparatus comprising:

a cradle for holding a piece of meat therein for movement relative to a cutting tool;

a first carriage located at a first end of the cradle;

a first actuator operatively coupled to the first carriage to move the first carriage along a first axis;

a second carriage located at a second end of the cradle;

a second actuator operatively coupled to the second carriage to move the second carriage along the first axis;

a third carriage located along a side of the cradle inbetween the first and second end of the cradle;

a third actuator operatively coupled to the third carriage to move the third carriage along a second axis wherein the second axis is perpendicular to the first axis; and a controller operatively coupled to the first, second and third actuators wherein the controller controls the speed of movement of the first, second and third actuators wherein the speed of movement of the first and second actuators are directly proportional to the speed of movement of the third actuator.

9. The apparatus of claim 8 further comprising an input device coupled to the controller, the input device comprising input parameters selectable by an operator to specify thicknesses and quantities of chops cut from the piece of meat for a plurality of groups wherein the controller uses the input parameters to control the movement of the first, second and third actuators.

10. The apparatus of claim 9 wherein the plurality of groups comprises at least four.

11. The apparatus of claim 9 wherein the thicknesses and quantities of chops can vary among the plurality of groups.

12. The apparatus of claim 9 wherein the input device is a touch screen located remotely from the cutting tool.

13. The apparatus of claim 9 wherein the input device further comprises input parameters selectable by the operator to specify what to do with a remainder of piece of meat after the plurality of groups have been cut.

14. The apparatus of claim 9 wherein the input device further comprises input parameters selectable by the operator to specify the speed of movement of the third actuator.

15. The apparatus of claim 8 further comprising a take-away conveyor located adjacent to the cutting tool for transporting chops cut from the piece of meat.

16. A method for automatically cutting meat, the method comprising the steps of:

(a) receiving input parameters from an operator separately specifying the thicknesses and quantities of chops to be cut from a piece of meat for each of a plurality of groups, wherein said input parameters for each of said groups can vary from those of others of said groups;

(b) converting the input parameters received in step (a) to motion control parameters;

(c) delaying execution of said motion control parameters until said input parameters for all of said plurality of groups have been received;

(d) outputting the motion control parameters to a cutting tool and cutting platform located adjacent to the cutting tool to control movement of the cutting tool and cutting platform according to the input parameters received in step (a); and (e) wherein a piece of meat held by said cutting platform is cut into said plurality of groups as specified by said received input parameters.

17. A computer-readable medium having computer-executable instructions for the method recited in claim 16.

18. A computer data signal embodied in a carrier wave readable by a computing system and encoding a computer process performing the method recited in claim 16.

19. An automated meat cutting apparatus for automatically cutting a length of meat into a plurality of groups of slices according to a pre-selectable schedule of cutting parameters determined prior to initiation of cutting, comprising:

(a) a cutting tool;

(b) a moveable carriage suitable for retainably holding and moving a length of meat relative to said cutting tool;

(c) an input device configured to receive operator input parameter selections prior to initiation of cutting of the meat, said parameter selections comprising:

(i) the number of groups into which the length of meat will be cut;

(ii) the number of slices of meat for each group;
(iii) the thickness of said slices for each group; and
(iv) wherein said parameter selections can vary from group to group; and
(d) a controller operatively coupled to said moveable carriage and to said input device and responsive to said received operator input selections to control movement of said carriage relative to said cutting tool, to successively cut the length of meat carried by said carriage into groups of slices according to said pre-selected input parameters.

20. The apparatus of claim 19 including a general purpose computing device operatively coupled with said input device and to said controller, and a computer program comprising one or more program modules executable by the computing device wherein the program modules comprise an input module for receiving said operator input parameter selections and a motion control module for converting said operator input parameter selections to output commands for said controller, to control said movement of said carriage.

* * * * *